US012601860B2

(12) United States Patent
Ringberg et al.

(10) Patent No.: US 12,601,860 B2
(45) Date of Patent: Apr. 14, 2026

(54) UNDULATING METAL LAYER AND OPTICAL CONSTRUCTION INCLUDING SAME

(71) Applicant: 3M INNOVATIVE PROPERTIES COMPANY, St. Paul, MN (US)

(72) Inventors: Adam T. Ringberg, St. Paul, MN (US); Vivian W. Jones, Woodbury, MN (US); James A. Phipps, River Falls, WI (US); Tri D. Pham, Woodbury, MN (US); Przemyslaw P. Markowicz, Woodbury, MN (US); Mark A. Roehrig, Stillwater, MN (US); Stephen P. Maki, North St. Paul, MN (US); Bing Hao, Woodbury, MN (US); David J. Rowe, Roseville, MN (US); Serena L. Mollenhauer, Robertsa, WI (US); Mikhail A. Belkin, Chicago, IL (US); Zhaohui Yang, North Oaks, MN (US); Jathan D. Edwards, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 387 days.

(21) Appl. No.: 18/250,293

(22) PCT Filed: Oct. 20, 2021

(86) PCT No.: PCT/IB2021/059689
§ 371 (c)(1),
(2) Date: Apr. 24, 2023

(87) PCT Pub. No.: WO2022/101721
PCT Pub. Date: May 19, 2022

(65) Prior Publication Data
US 2023/0400606 A1      Dec. 14, 2023

Related U.S. Application Data

(60) Provisional application No. 63/114,454, filed on Nov. 16, 2020.

(51) Int. Cl.
*G02B 3/00* (2006.01)
*G02B 5/00* (2006.01)
(52) U.S. Cl.
CPC ........... *G02B 3/0056* (2013.01); *G02B 5/005* (2013.01)
(58) Field of Classification Search
None
See application file for complete search history.

(56) References Cited

U.S. PATENT DOCUMENTS 5,175,030 A    12/1992  Lu et al.
5,183,597 A     2/1993  Lu
(Continued)

FOREIGN PATENT DOCUMENTS

CN      211427367 U     9/2020
JP     2007264351 A    10/2007
(Continued)

OTHER PUBLICATIONS

International Search Report for PCT International Application No. PCT/IB2021/059689, mailed on Dec. 28, 2021, 3 pages.

*Primary Examiner* — Darryl J Collins
(74) *Attorney, Agent, or Firm* — Clifton F. Richardson

(57) ABSTRACT

An optical construction includes a lens layer and optically opaque first and second mask layers. The lens layer has a first major surface including a plurality of microlenses arranged along orthogonal first and second directions. The first and second mask layers are spaced apart from the first major surface and define respective pluralities of through first and second openings therein arranged along the first and
(Continued)

second directions. The first mask layer is disposed between the structured first major surface and the second mask layer. There is a one-to-one correspondence between the microlenses and the first and second openings. The optical construction includes an intermediate layer disposed between the structured first major surface and the first mask layer and including an undulating second major surface facing, and in substantial registration with, an undulating third major surface of first mask layer so as to define a substantially uniform spacing therebetween.

19 Claims, 9 Drawing Sheets

(56) References Cited

U.S. PATENT DOCUMENTS

| | | | | | |
|---|---|---|---|---|---|
| 5,466,926 | A | * | 11/1995 | Sasano | H10F 39/024 |
| | | | | | 250/216 |
| 9,919,339 | B2 | | 3/2018 | Johnson et al. | |

| | | | | | |
|---|---|---|---|---|---|
| 2006/0279845 | A1 | * | 12/2006 | Gurevich | G02B 3/0056 |
| | | | | | 359/622 |
| 2007/0218318 | A1 | * | 9/2007 | Watanabe | G11B 5/7368 |
| | | | | | 428/836 |
| 2007/0258149 | A1 | | 11/2007 | Gardner et al. | |
| 2008/0094547 | A1 | | 4/2008 | Sugita et al. | |
| 2012/0064296 | A1 | | 3/2012 | Walker, Jr. et al. | |
| 2013/0011608 | A1 | | 1/2013 | Wolk et al. | |
| 2013/0235614 | A1 | | 9/2013 | Wolk et al. | |
| 2020/0020753 | A1 | | 1/2020 | Zhang | |

FOREIGN PATENT DOCUMENTS

| | | |
|---|---|---|
| JP | 2008275655 A | 11/2008 |
| JP | 2017111255 A | 6/2017 |
| WO | 2019135190 A1 | 7/2019 |
| WO | 2020035768 A1 | 2/2020 |
| WO | 2021111297 A1 | 6/2021 |
| WO | 2022058815 A1 | 3/2022 |

* cited by examiner

UNDULATING METAL LAYER AND OPTICAL CONSTRUCTION INCLUDING SAME

CROSS REFERENCE TO RELATED APPLICATIONS

This application is a national stage filing under 35 U.S.C. 371 of PCT/IB2021/059689, filed Oct. 20, 2021, which claims the benefit of U.S. Application No. 63/114,454, filed Nov. 16, 2020, the disclosures of which are incorporated by reference in their entirety herein.

BACKGROUND

An optical element can include microlenses and a pinhole mask having pinholes aligned with the microlenses.

SUMMARY

The present description relates generally to an undulating metal layer and to an optical construction. The optical construction can include a lens layer and the undulating metal layer. A display system can include the optical construction proximate to a sensor.

In some aspects of the present description, an optical construction including a lens layer and spaced apart optically opaque first and second mask layers is provided. The lens layer has a structured first major surface including a plurality of microlenses arranged along orthogonal first and second directions. The spaced apart optically opaque first and second mask layers are spaced apart from the first major surface and define respective pluralities of through first and second openings therein arranged along the first and second directions. The first mask layer is disposed between the structured first major surface and the second mask layer. There is a one-to-one correspondence between the microlenses and the through first and second openings. The optical construction includes an intermediate layer disposed between the structured first major surface and the first mask layer and including an undulating second major surface facing, and in substantial registration with, an undulating third major surface of first mask layer so as to define a substantially uniform spacing therebetween.

In some aspects of the present description, an optical construction is provided. The optical construction includes a lens layer including a plurality of microlenses arranged along orthogonal first and second directions; an optically opaque first mask layer spaced apart from the plurality of microlenses and defining a plurality of through first openings therein arranged along the first and second directions; and an undulating metal layer having a substantially uniform thickness in a range of about 50 nm to about 500 nm and embedded in the optical construction between the plurality of microlenses and the first mask layer, such that for a visible light propagating along a thickness direction orthogonal to the first and second directions and incident on the optical construction from the lens layer side thereof, the optical construction reflects less than about 25% of the incident light. There is a one-to-one correspondence between the microlenses and the through first openings.

In some aspects of the present description, a metal layer including a regularly undulating first major surface and an opposing regularly undulating second major surface is provided. The regular undulations of each of the first and second major surfaces are regularly arranged along at least a first direction at a pitch of less than about 500 nm. The metal layer has an average thickness in a range of about 50 nm to about 500 nm and defines a plurality of through openings therein arranged along the first direction and an orthogonal second direction.

In some aspects of the present description, a metal layer including a regularly undulating first major surface and an opposing regularly undulating second major surface is provided. Regular undulations of the first and second major surfaces are in substantial registration with each other such that the first and second major surfaces define a substantially uniform spacing therebetween. The regular undulations of each of the first and second major surfaces are arranged along at least a first direction at a pitch of less than about 500 nm. The metal layer is optically opaque and defines a plurality of through openings therein arranged along the first direction and an orthogonal second direction.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

An optical construction can include a microlens array and a metal mask having an array of through openings (e.g., pinholes) corresponding to the microlenses. However, it has been found that using a metal mask can result in unwanted specular reflection from regions of the mask between through openings. According to some embodiments of the present description, it has been found that using an undulating metal layer (e.g., with undulations having a pitch less than a wavelength of visible light) rather than a flat or substantially planar metal layer can substantially reduce the unwanted reflection. The undulating metal layer can be formed by depositing (e.g., sputtering) metal onto a layer having an undulating major surface formed by replicating a pattern from a tool (e.g., in a cast and cure process). In some cases, forming a lens layer on one side of a substrate and forming a layer having an undulating major surface on an opposite side of the substrate can cause an undesired curl in the resulting optical construction. However, it has been found the curl can be reduced or substantially eliminated by suitable selection of the materials and thickness for the lens layer and the layer having the undulating major surface.

In some embodiments, the optical constructions are useful as angularly selective optical filters which can be used in a variety of applications such as fingerprint sensing applications, for example. The optical construction may be disposed between a fingerprint sensing area of a device (e.g., cell phone) and a sensor in the device and can be adapted to transmit light reflected from a finger in the fingerprint sensing area to the sensor while rejecting light incident on the optical construction from different angles. A second mask layer may be used in addition to an undulating metal mask layer to reduce undesired cross-talk (e.g., where light incident on one microlens is transmitted through an opening corresponding to another microlens).

Figure 1:
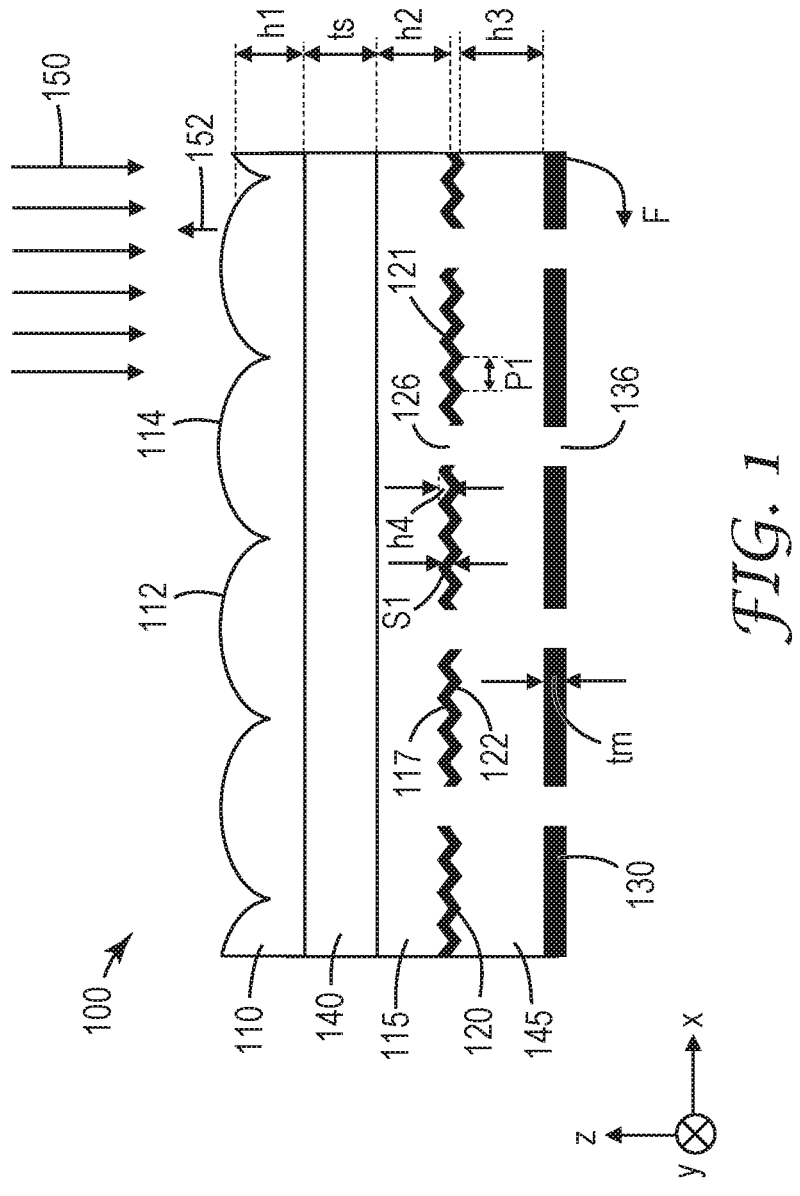
FIG. 1 is a schematic cross-sectional view of an optical construction, according to some embodiments.

FIG. 1 is a schematic cross-sectional view of an optical construction 100, according to some embodiments. The optical construction includes a lens layer 110 and layers 120 and 130, which may be mask layers in which case one of the layers 120 and 130 may be referred to as a first mask layer and the other of the layers 120 and 130 may be referred to as a second mask layer. The layers 120 and 130 include through openings 126 and 136, respectively. The through openings in the first mask layer may be referred to as first openings and the through openings in the second mask layer may be referred to as second openings. In some embodiments, one or both of the layers 120 and 130 may be a metal layer. In embodiments, the layer 120 is an undulating metal layer. In some embodiments, the layer 130 is a substantially planar layer. The lens layer 110 may be disposed on a substrate layer 140. In some embodiments, the optical construction 100 further includes an intermediate layer 115 disposed between the substrate layer 140 and the layer 120, and/or further includes a spacer layer 145 disposed between the layers 120 and 130. The optical construction 100 can include first major surface 112, second major surface 117, and third major surface 122 where the first major surface 112 is a surface of the lens layer 110 facing away from the second major surface 117 which is a major surface of the intermediate layer 115 facing the third major surface 122 and facing away from the first major surface 112. The third major surface 122 is a major surface of the layer 120 facing away from the intermediate layer 115. The third major surface 122 of the optical construction 100 may also or alternatively be described as a second major surface of the layer 120 opposite a first major surface 121 of the layer 120.

In some embodiments, the optical construction 100 includes a lens layer 110 including a structured first major surface 112 including a plurality of microlenses 114 arranged along orthogonal first and second directions (e.g., x- and y-directions, referring to the illustrated x-y-z coordinate system). The optical construction 100 can further include spaced apart optically opaque first and second mask layers 120 and 130 spaced apart from the first major surface 112 and defining respective pluralities of through first and second openings 126 and 136 therein arranged along the first and second directions, where the first mask layer 120 is disposed between the structured first major surface 112 and the second mask layer 130. In some embodiments, there is a one-to-one correspondence between the microlenses 114 and the through first and second openings 126 and 136. The optical construction 100 can further include an intermediate layer 115 disposed between the structured first major surface 112 and the first mask layer 120 and including an undulating second major 117 surface facing, and in substantial registration with, an undulating third major surface 122 of first mask layer 120 so as to define a substantially uniform spacing S1 (e.g., in a range of about 50 nm to about 500 nm) therebetween.

In some embodiments, the optical construction 100 includes a lens layer 110 including a plurality of microlenses 114 arranged along orthogonal first and second directions (e.g., x- and y-direction); an optically opaque first mask layer 130 spaced apart from the plurality of microlenses 114 and defining a plurality of through first openings 136 therein arranged along the first and second directions; and an undulating metal layer 120 having a substantially uniform thickness S1 (e.g., in a range of about 50 nm to about 500 nm) and embedded in the optical construction between the plurality of microlenses and the first mask layer 130. In some embodiments, there is a one-to-one correspondence between the microlenses 114 and the through first openings 136. In some embodiments, the metal layer 120, which may be described as a second mask layer, defines a plurality of through second openings 126 therein arranged along the first and second directions. In some embodiments, there is a one-to-one correspondence between the microlenses 114 and the through second openings 126.

A microlens is generally a lens with at least two orthogonal dimensions (e.g., a height and a diameter, or a diameter along two axes) less than about 1 mm and greater than about 100 nm. The microlenses can have an average diameter in a range of about 0.5 micrometers to about 500 micrometers, or about 5 micrometers to about 100 micrometers, for example. The microlenses can have an average radius of curvature in a range of 5 micrometers to 50 micrometers, for example. The microlenses can have any suitable shape. The microlenses can be spherical or aspherical microlenses, for example. In some embodiments, the microlenses are pillow lenses which can allow for a higher fraction of the area covered by the lenses to be optically active, for example. A pillow lens may be substantially symmetric under reflection about two orthogonal planes (e.g., planes passing through a center of the lens and parallel to the x-z plane and the y-z plane, respectively), or about three planes parallel to the thickness direction of the lens film where each plane makes an angle of about 60 degrees with each other plane, without being rotationally symmetric about any axis.

In some embodiments, for a visible light 150 propagating along a thickness direction (e.g., minus z-direction) orthogonal to the first and second directions and incident on the optical construction 100 from the lens layer 110 side thereof, the optical construction reflects (see, e.g., reflected light 152) less than about 25%, or less than about 23%, or less than about 20%, or less than about 18%, or less than about 16%, or less than about 14%, or less than about 12%, less than about 10% of the incident light 150. The visible light 150 can be understood to substantially fill at least one of the microlenses 114. The visible light 150 can include one or more visible wavelengths (e.g., from about 400 nm to about 700 nm) and/or can include wavelengths uniformly distributed over the range of about 400 nm to about 700 nm, for example. The reflectance (e.g., less than about 25%) of the optical construction for the visible light 150 may be the reflectance averaged over wavelengths from about 400 nm to about 700 nm (e.g., corresponding to wavelengths uniformly distributed over the range of about 400 nm to about 700 nm), for example, or can be for a wavelength of about 550 nm (e.g., corresponding to the visible light 150 having the wavelength 550 nm), for example.

The optical construction 100 has a thickness direction (e.g., z-direction) orthogonal to the first and second directions. The thickness or spacing S1 is along the thickness direction of the optical construction 100. The first mask layer 120, which in some embodiments is a metal layer, extends primarily along the first and second directions (e.g., x- and y-directions) and has a thickness along a thickness direction (e.g., z-direction) orthogonal to the first and second directions. In the illustrated embodiment, the thickness of the first mask layer 120 is the spacing S1. A thickness of a layer or a spacing between the layer and an adjacent layer or between opposing major surfaces of the layer may be described as substantially uniform if the thickness or spacing varies by less than 50% [(maximum minus minimum)/maximum times 100%] over at least 80% by area of a major surface of the layer. In some embodiments, the substantially uniform spacing or thickness varies by less than 40% or less than 30% over at least 80% by area of the major surface. In some such embodiments, or in other embodiments, the at least 80% by area of the major surface is at least 85%, or at least 90%, or at least 95% by area of the major surface.

In some embodiments, the substantially uniform spacing or thickness S1 is in a range of about 50 nm to about 2500 nm, or to about 2000 nm, or to about 1500 nm, or to about 1000 nm, or to about 500 nm, or to about 400 nm. S1 can be selected such that the layer 120 is optically opaque. In some embodiments, a metal substantially fills the substantially uniform spacing. In other words, in some embodiments, a metal fills substantially the entire distance S1 between the major surfaces 117 and 122. A metal substantially filling the substantially uniform spacing can fill at least 60%, or at least 80%, or at least 90% of a volume of the spacing, for example. In some embodiments, the metal (e.g., the metal substantially filling the spacing S1 or the metal of layer 120) includes at least one transition metal. In some embodiments, the metal includes one or more transition metals from groups 4 to 10 of the periodic table. In some embodiments, the one or more transition metals from groups 4 to 10 of the periodic table are from series 4 or 5 of the periodic table. In some such embodiments, or in other embodiments, the substantially uniform spacing or thickness S1 can be in a range of about 50 nm to about 500 nm or about 50 nm to about 400 nm (e.g., such that the layer 120 is optically opaque). In some embodiments, the metal includes one or more of zirconium, titanium, chromium, nickel, or iron. For example, the metal can be composed of a single elemental metal or the metal can be or include an alloy such as a chromium-nickel alloy or a stainless steel such as stainless steel 304 which includes iron and includes chromium and nickel as the main non-iron components. In some embodiments, the metal layer includes other metals such as aluminum or silver, for example.

In some embodiments, the mask layer 130 is formed from a metal such as aluminum or any of the metals described for layer 120. In some such embodiments, or in other embodiments, the mask layer 130 may have an average thickness tm in any of the ranges described for S1. In some embodiments, the mask layer 130 is formed from a polymeric material that includes optically absorptive dye(s) or pigment(s), such as carbon black particles, for example, dispersed in the polymeric material. In some such embodiments, or in other embodiments, the mask layer 130 has an average thickness tm in a range of about 1 to about 10 micrometers, for example.

A layer extending primarily along first and second directions (e.g., x- and y-directions) can be described as optically opaque when the transmittance of unpolarized visible light (e.g., average transmittance over wavelengths from about 400 nm to about 700 nm) incident on the layer along a third direction (parallel to z-direction) normal to the first and second directions in a region between any through openings in the layer is less than 10%, or less than 5%, or less than 1%, or less than 0.5%, or less than 0.1%. The layer can alternatively, or in addition, be characterized by its optical density (minus base 10 logarithm of [transmittance/100%], where the transmittance is for unpolarized visible light incident along the third direction unless indicated differently). In some embodiments, between adjacent through openings, the mask layer has an optical density of greater than about 1.5, or greater than about 2, or greater than about 2.5, or greater than about 3.

In some embodiments, the through openings 126 and/or 136 have an average largest lateral dimension (largest dimension in x-y plane) in a range of about 500 nm to about 50 micrometers, or about 1 micrometer to about 30 micrometers, or about 1 micrometer to about 15 micrometers, or about 1.5 micrometers to about 10 micrometers, for example. The through openings 126 and/or 136 can be approximately circular in shape.

In some aspects of the present description, an undulating metal layer 120 is provided. In some embodiments, a metal layer 120 includes a regularly undulating first major surface 121 and an opposing regularly undulating second major surface 122, where the regular undulations of each of the first and second major surfaces 121 and 122 are regularly arranged along at least a first direction (e.g., x-direction) at a pitch P1 of less than about 500 nm or in any range described elsewhere herein. The metal layer 120 may have an average thickness S1 in a range of about 50 nm to about 500 nm or in any other range for S1 described elsewhere herein. The metal layer 120 defines a plurality of through openings 126 therein arranged along the first direction and an orthogonal second direction (e.g., y-direction). In some embodiments, regular undulations of the first and second major surfaces 121 and 122 are in substantial registration with each other (e.g., registered to within less than 50% or 30% or 10% of a thickness of the metal layer 120 and/or sufficiently registered that the first and second major surfaces define a substantially uniform spacing S1 therebetween).

In some embodiments, a metal layer 120 includes a regularly undulating first major surface 121 and an opposing regularly undulating second major surface 122, where regular undulations of the first and second major surfaces 121 and 122 are in substantial registration with each other such that the first and second major surfaces define a substantially uniform spacing S1 therebetween. The substantially uniform spacing S1 may be in any range described elsewhere. The regular undulations of each of the first and second major surfaces 121 and 122 are arranged along at least a first direction (e.g., x-direction) at a pitch P1 of less than about 500 nm or in any range described elsewhere herein. The metal layer 120 may be optically opaque and may define a plurality of through openings 126 therein arranged along the first direction and an orthogonal second direction (e.g., y-direction).

In some embodiments, an optical construction 100 includes a lens layer 110 and the metal layer 120, where the lens layer 110 includes a plurality of microlenses 114 arranged along the first and second directions, and where there is a one-to-one correspondence between the microlenses 114 and the through openings 126. In some embodiments, an optical construction 100 includes a lens layer 110 including a structured first major surface 112 including a plurality of microlenses 114 arranged along the first and second directions; and the metal layer 120, where the metal layer is substantially coextensive with the lens layer 110, and where there is a one-to-one correspondence between the microlenses 114 and the through openings 126. In some such embodiments, or in other embodiments, for a visible light 150 propagating along a direction (e.g., minus z-direction) orthogonal to the first and second directions (e.g., x- and y-directions) and incident on the optical construction from the lens layer side thereof, the optical construction 100 reflects less than about 25% of the incident light 150, or reflects in any range described elsewhere herein. In some embodiments, the optical construction 100 further includes an intermediate layer 115 disposed between the lens layer 110 and the metal layer 120, where the metal layer 120 is disposed on, and in substantial registration with, an undulating major surface 117 of the intermediate layer 115. In some embodiments, the optical construction further includes a mask layer 130 defining a plurality of through openings 136 therein arranged along the first and second directions, where the metal layer 120 is disposed between the lens layer 110 and the mask layer 130. There may be a one-to-one correspondence between the microlenses 114 and the through openings 136 in the mask layer 130.

Layers can be described as substantially coextensive with each other if at least about 60% of each layer is coextensive with at least about 60% of each other layer in a top plan view (view along the thickness direction of the optical construction 100). Here, 60% of a layer, for example, refers to 60% by area in the top plan view (e.g., 60% of an area of the layer projected onto a plane defined by the first and second direction). In some embodiments, for layers describes as substantially coextensive, at least about 70%, or at least about 80%, or at least about 90% of each layer is coextensive with at least about 70%, or at least about 80%, or at least about 90% of each other layer in the top plan view.

In some embodiments, the lens and the intermediate layers have respective average thicknesses h1 and h2, where $0.5 \leq h2/h1 \leq 10$, or $0.7 \leq h2/h1 \leq 5$, or $0.9 \leq h2/h1 \leq 3$. In some embodiments, each of h1 and h2 is in a range of 3 micrometers to 50 micrometers or 5 micrometers to 40 micrometers. As described further elsewhere herein, the ratio h2/h1 can be selected to reduce or minimize curl of the optical construction 100. In some embodiments, the substrate layer 140 has an average thickness ts which may be at least about 10 micrometers or at least about 15 micrometers or at least about 20 micrometers and/or which may be no more than about 150 micrometers or no more than about 100 micrometers, for example. In some embodiments, ts is greater than at least one of h1 or h2. In some embodiments, ts is greater than each of h1 and h2. In some embodiments, the spacer layer 145 has average thickness h3 which may be in a range of about 1 to about 50 micrometers, or about 2 to about 40 micrometers, for example. In some embodiments, a total thickness of the optical construction 100 is no greater than about 200 micrometers, or no greater than about 150 micrometers, or no greater than about 100 micrometers (e.g., about 30 micrometers to about 200 micrometers, or about 40 micrometers to about 150 micrometers).

In some embodiments, regular undulations of the first and second major surface, 121 and 122 are in substantial registration with each other. In some embodiments, the undulations of the metal layer 120, or the undulations of the first and second major surfaces 121 and 122, are regularly arranged along at least one direction (e.g., x-direction) at a pitch P1 of less than about 500 nm. In some embodiments, the pitch P1 is less than about 400 nm, or less than about 350 nm, or less than about 300 nm. In some such embodiments, or in other embodiments, the pitch P1 is greater than about 50 nm or greater than about 100 nm. The first and second major surfaces 121 and 122 of the layer 120 may correspond to the second and third major surfaces 117 and 122 of the optical construction 100. In some embodiments, the substantially registered undulations of the second and third major surfaces 117 and 122 are regularly arranged along at least one direction (e.g., x-direction) at a pitch P1 which may be less than about 500 nm or which may be in any range described elsewhere herein. In some embodiments, S1 may be less than or about equal to P1. In some embodiments, the undulations of the major surface 117, or the undulations of the first (121) and/or second (122) major surface, have an average peak-to-valley height h4 which may be in any of the ranges described for S1 or for P1, for example. In some embodiments, the undulations of the first major surface 121 have an average peak-to-valley height h4 in a range of about 50 nm to about 2500 nm, or about 100 nm to about 1500 nm, for example.

Figure 2:
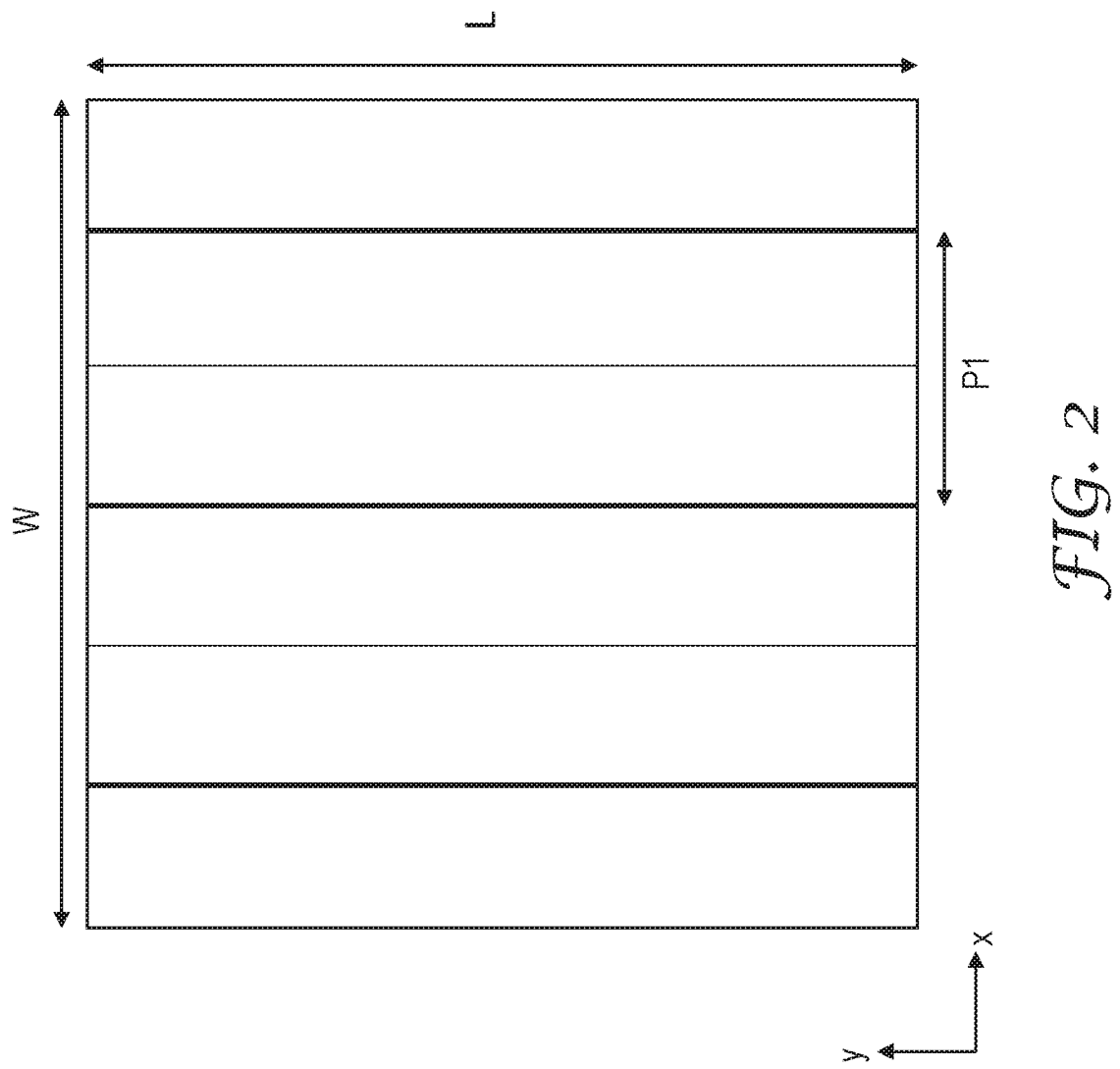
FIGS. 2-3 are schematic top plan views of undulations of layers or surfaces of an optical construction or a portion of an optical construction, according to some embodiments.
Figure 3:
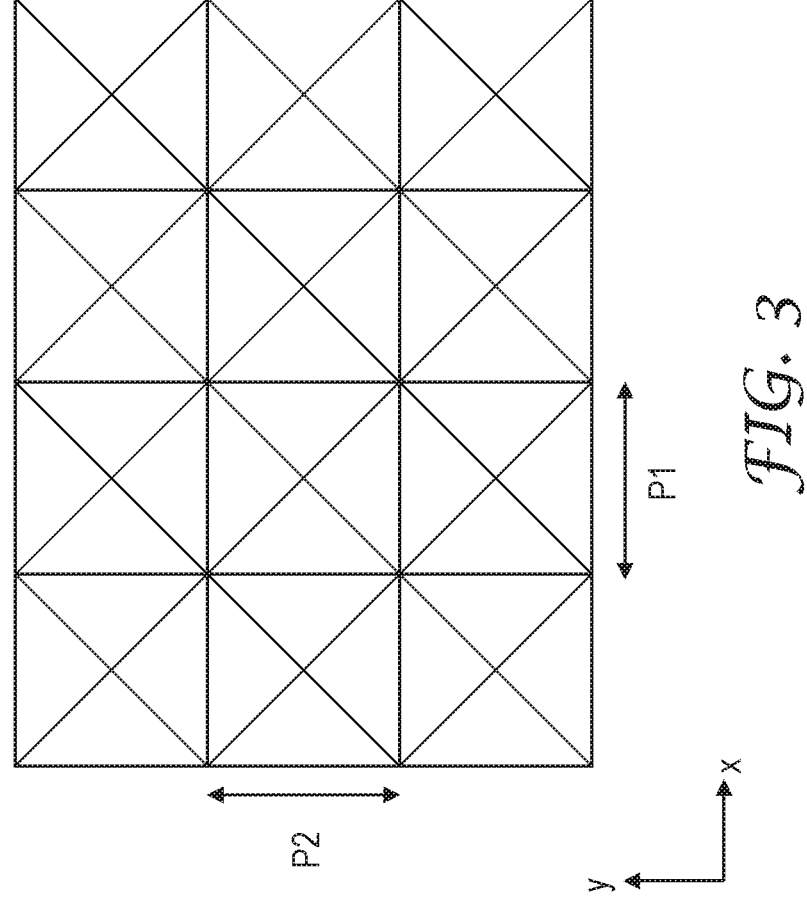

FIGS. 2-3 are schematic top plan views of undulations of layers or surfaces of an optical construction or a portion of an optical construction, according to some embodiments. In FIG. 2, the undulations extend along a y-direction and are regularly arranged along an x-direction at a pitch P1, according to some embodiments. The undulations of FIG. 2 may be a regular array of linear prisms. The optical construction or portion of an optical construction shown in FIG. 2 has a width W along the x-direction and a length L along the y-direction. In FIG. 3, the undulations are regularly arranged the x-direction at a pitch P1 and along the y-direction at a pitch P2. P1 and P2 may independently be in any of the ranges described elsewhere herein for P1 (e.g., less than about 500 nm). The undulations of FIG. 3 may be a regular two-dimensional array of pyramids.

In some embodiments, the substantially registered undulations of the second and third major surfaces 117 and 122, and/or the undulations of the layer 120, extend along a third direction (e.g., y-direction) and are regularly arranged along an orthogonal fourth direction (e.g., x-direction). The undulations may be regularly arranged along the fourth direction at a pitch P1 of less than about 500 nm. The pitch P1 may be in any range described elsewhere herein. The third and fourth directions may be the same as the second and first directions, respectively, or may be rotated (e.g., about the z-axis) relative to the second and first directions, for example. In some embodiments, the substantially registered undulations of the second and third major surfaces 117 and 122, and/or the undulations of the layer 120, are regularly arranged along each of a third direction (e.g., y-direction) and a different (e.g., orthogonal) fourth direction (e.g., x-direction) at a pitch P2 and P1, respectively, each less than about 500 nm. Each of P1 and P2 may be in any range described elsewhere herein for P1. The undulations may be regularly arranged on a hexagonal lattice, for example. In some embodiments, the substantially registered undulations of the second and third major surfaces 117 and 122, and/or the undulations of the layer 120, are aperiodic or irregularly arranged. For example, the undulations may be in a quasicrystal pattern or may be in a random or pseudo-random (appearing random but derived from a deterministic process) arrangement.

Figure 4A:
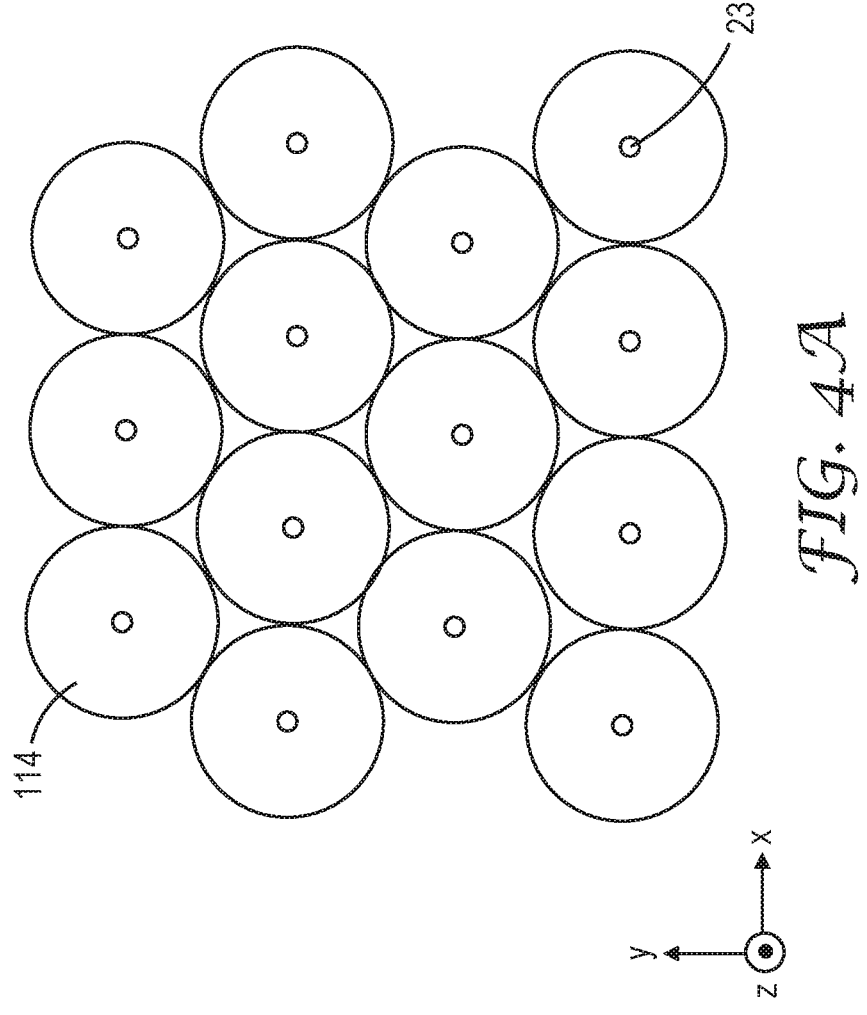
FIGS. 4A-4B are schematic top projected views of pluralities of microlenses and through openings, according to some embodiments.
Figure 4B:
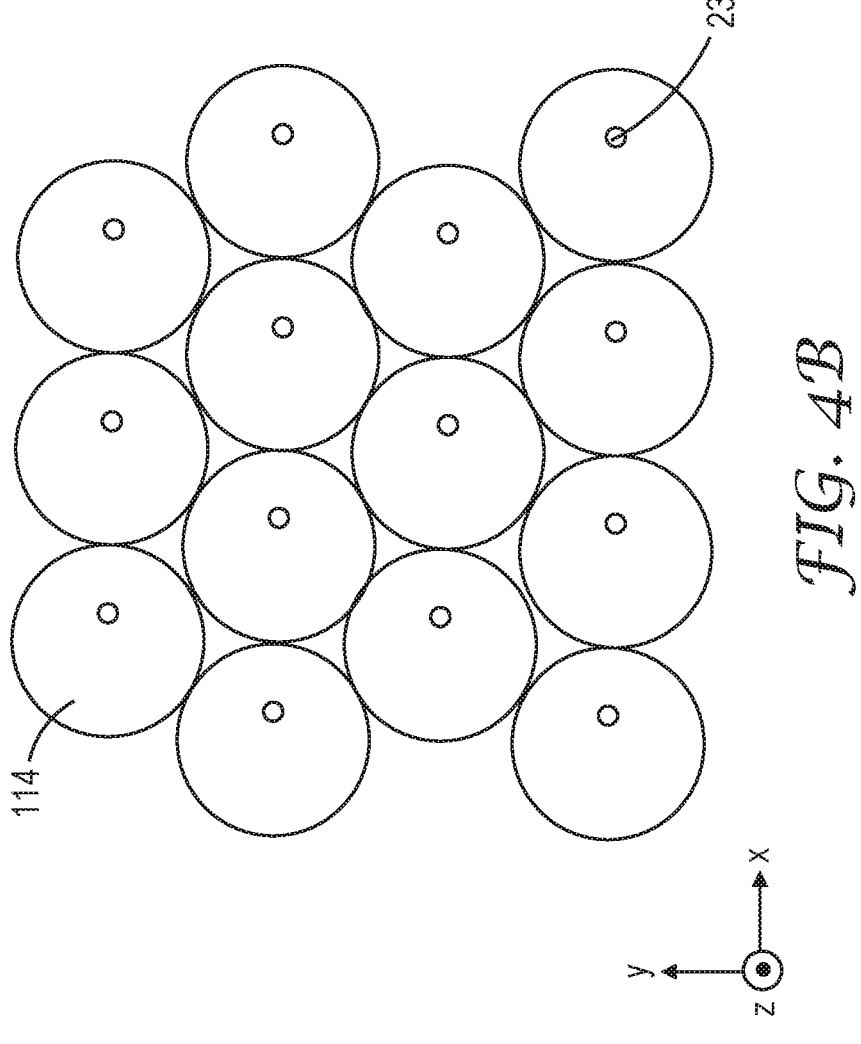

FIGS. 4A-4B are schematic top projected views of pluralities of microlenses 114 and through openings 231 (e.g., corresponding to through openings 126 and/or to through openings 136), according to some embodiments. The microlenses 114 are arranged along orthogonal first and second directions (e.g., x- and y-directions) and the through openings 231 are arranged along the first and second directions. In the illustrated embodiments, the microlenses 114 and through openings 231 are on a regular triangular array. Other patterns are also possible (e.g., square or rectangular array, other two-dimensional periodic arrays, or irregular patterns). The optical construction 100 may be adapted to primarily transmit light incident along a predetermined direction (e.g., along a thickness direction of the optical constructions) but not along other directions. In the embodiment illustrated in FIG. 4A, the microlenses 114 and the through openings 231 are centered on straight lines parallel to the z-direction. This allows light incident on the optical construction along the z-axis to be transmitted through the optical lenses and the through openings, while blocking obliquely incident light. In the embodiment illustrated in FIG. 4B, the microlenses 114 and the through openings 231 are centered on straight lines making an oblique angle to the z-direction. This allows light incident on the optical construction along a direction making the oblique angle to the z-direction to be transmitted through the optical lenses and the through openings, while blocking normally incident light, for example.

In some embodiments, the lens layer 110 is formed by casting a resin onto the substrate 140 against a tool defining the microlenses 114 and then curing the resin. Similarly, in some embodiments, the intermediate layer 115 is formed by casting a resin onto the substrate 140 against a tool defining the undulating surface 117 and then curing the resin. Suitable resins (e.g., acrylates) and suitable cast and cure methods are known in the art and are described in U.S. Pat. No. 5,175,030 (Lu et al.), U.S. Pat. No. 5,183,597 (Lu) and U.S. Pat. No. 9,919,339 (Johnson et al.), and in U.S. Pat. Appl. Publ. No. 2012/0064296 (Walker, J R. et al), for example. Suitable substrates include polyethylene terephthalate (PET) substrates. The layer 120 can then be coated or otherwise deposited (e.g., vapor deposited or sputtered) onto the undulating surface 117. The spacer layer 145 can then be formed by coating a resin (e.g., an acrylate) over the major surface 122 of the layer 120 and then curing the resin, for example. The layer 130 can then be coated or otherwise deposited (e.g., vapor deposited or sputtered) onto the spacer layer 145. The through openings 126 and 136 can then be formed by ablation through the microlenses 114 using a coherent, pulsed light source (e.g., laser) with wavelengths from 400 nm-1200 nm, or from 500 nm-1100 nm, or from 1000 nm-1100 nm, or from 1020 nm to 1100 nm, for example. A wide range of lasers can be used for the light source. Suitable lasers include Nd:YAG lasers, fiber lasers, and diode lasers, for example. The light source can be a doped fiber laser that produces a near infrared (NIR) band having wavelengths from about 1020 nm to about 1100 nm, for example. Typically, the layers 120 and 130 are ablated, while the layers 115 and 145 are substantially not ablated. Creating apertures in a layer using a laser through a microlens array is generally described in U.S. Pat. App. Publ. No. 2007/0258149 (Gardner et al.), for example. In some examples, the through holes were formed by laser ablation using a 40 W fiber laser (available from SPI Lasers, Southampton, UK) at 50% power with a 7× expander installed, where the fiber laser operated at 20 kHz and the pulse duration was set to 30 ns, and where a 167 mm F-Theta lens was used with a galvo scanner moving the laser beam at a speed of 2 m/s with a 100 micrometer spacing between lines. Other suitable methods of forming the through openings include microprinting and photolithographic techniques (e.g., including using the microlens layer to expose a photolithographic mask).

The optical construction 100 can include optional additional elements or layers disposed on the lens layer 110 opposite the substrate layer 140 and/or disposed on the layer 140 opposite the layer 145. For example, a low index layer can be disposed on the lens layer 110 or the lens layer 110 can include optical decoupling structures, and/or a wavelength-selective optical filter can be disposed on the layer 130. Examples of such layers or structures can be found in International Appl. Pub. No. WO 2020/035768 (Yang et al.), for example.

In some embodiments, the microlens layer is bonded to a display panel or other component through a low index layer. In some embodiments, the low index layer has a refractive index of no more than 1.3 (e.g., in a range of 1.1 to 1.3) and is disposed on and has a major surface substantially conforming to the first major surface 103 of the lens layer 110. Refractive index refers to the refractive index at 633 nm unless indicated otherwise. Layers having a refractive index of no more than 1.3 may be nanovoided layers as described in U.S. Pat. Appl. Publ. Nos. 2013/0011608 (Wolk et al.) and 2013/0235614 (Wolk et al.), for example.

In some embodiments, the lens layer 110 further includes optical decoupling structures which may be disposed between adjacent microlenses. The optical decoupling structures can be any objects which protrude beyond the microlenses for attachment to an adjacent layer such that the adjacent layer does not contact the microlenses. The optical decoupling structures can be cylindrical posts or can be posts having a non-circular cross-section (e.g., rectangular, square, elliptical, or triangular cross-section). The optical decoupling structures can have a constant cross-section, or the cross-section can vary in the thickness direction (e.g., the optical decoupling structures can be posts which are tapered to be thinner near the top of the posts). In some embodiments, the optical decoupling structures have a tapered elliptical cross-section. For example, the optical decoupling structures can have any of the geometries of the optical decoupling structures described in International Appl. Pub. No. WO 2019/135190 (Pham et al.). In some embodiments, the optical decoupling structures extend from a base of the array of microlenses. In some embodiments, at least some optical decoupling structures are disposed on top of at least some of the microlenses. Related optical constructions including optical decoupling structures are described in International Appl. Pub. No. WO 2020/035768 (Yang et al.) and in U.S. Appl. No. 62/944,676 filed Dec. 6, 2019 and titled "Optical Layer and Optical System".

In some embodiments, an optical construction includes two pluralities of microlenses. For example, an optical construction can have opposite first and second major surfaces each including a plurality of microlenses. The optical construction or layer can further include an embedded optically opaque mask layer disposed between and spaced apart from the first and second major surfaces. The mask layer can be or include an undulating metal layer as described further elsewhere herein. Related optical constructions including opposing microlens layers are described in International Appl. Pub. No. WO 2020/035768 (Yang et al.) and in U.S. Appl. No. 62/944,676 filed Dec. 6, 2019 and titled "Optical Layer and Optical System".

In some embodiments, it is desired that the substrate 140 remain substantially flat (e.g., little or no curl) after the lens layer 110 and the intermediate layer 115 are formed. The resins used in forming the layers may shrink as they cure, so it may be desired to use similar resin chemistries having similar shrinkages for the lens and intermediate layers 110 and 115. In some embodiments, each of the lens and the intermediate layers 110 and 115 includes a radiation (e.g., ultra-violet) cured polymer. In some such embodiments, or in other embodiments, each of the lens and the intermediate layers 110 and 115 includes a cross-linked polymer. In some such embodiments, or in other embodiments, each of the lens and the intermediate layers 110 and 115 includes an acrylate. In some embodiments, different resins (e.g., different acrylates or resins from different classes of chemistries) are used for the lens and intermediate layers 110 and 115 and the relative thickness of the layers (e.g., 0.7≤h2/h1≤5) are selected to reduce or eliminate the resulting curl. For example, a thicker layer formed from a resin with a lower tendency to shrink upon curing may be used to offset the effects on curl of a thinner layer formed from a resin with a higher tendency to shrink upon curing.

Figure 5:
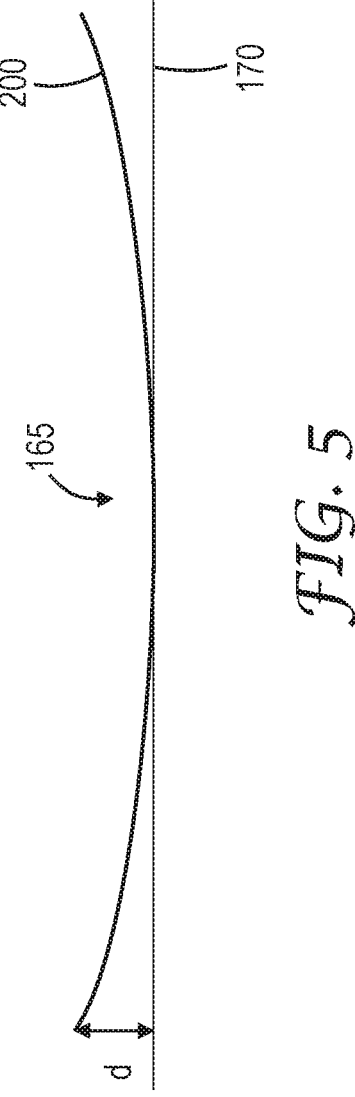
FIG. 5 is a schematic illustration of a curl of an optical construction or a portion of an optical construction, according to some embodiments.

FIG. 5 is a schematic illustration of a curl of a portion 200 of an optical construction which may correspond to optical construction 100, for example, according to some embodiments. The portion 200 is oriented such that the portion 200 curves away from the flat surface 170. In some embodiments, when a portion 200 of the optical construction 100 is removed from the optical construction 100 and is laid on a flat surface 170 such that at least a central portion 165 of the portion 200 contacts the flat surface 170, an average displacement d of corners of the portion 200 from the flat surface 170 is less than about 5 mm, or less than about 4 mm, or less than about 3 mm, or less than about 2 mm, where the portion 200 has a shape of a generally rectangular sheet having a length and a width (e.g., corresponding to the length L and width W of FIG. 2) each within a range of about 8.5 inches to about 9 inches. Note that a square may be considered to be a special case of a rectangle. Alternatively, the curl determined according to the ASTM F415-87(2005) test standard may be in any of these ranges.

In some embodiments, a high (e.g., at least about 20 On) minimum average peel force F of the first mask layer from the substrate or intermediate layers is desired. It has been found that including the intermediate layer 115 can improve the bonding of the mask layer 120 to the substrate layer 140. For example, it has been found that a metal layer (e.g., a layer of a transition metal or alloy of transition metals) formed (e.g., sputtered) onto an acrylate layer, for example, can provide a suitable minimum average peel force F, while a metal layer formed directly on typical substrate layers (e.g., a polyethylene terephthalate (PET) layer) may have an undesirably low peel force. The minimum average peel force F is determined using a 180 degree peel test (see, e.g., the peel force F schematically depicted in FIG. 1) at a peel speed of 12 in/min, unless indicated differently. The average peel force is measured for each of a plurality of samples (5 samples, unless indicated differently) as an average over time (5 seconds, unless indicated differently) of the force per unit width of the sample applied during peeling. The minimum over the plurality of samples of these average peel forces is the minimum average peel force F. In some embodiments, a minimum average peel force F between the intermediate and the first mask layers 115 and 120 is at least about 20 On, or at least about 30 On, or at least about 40 On, or at least about 50 On. In some such embodiments, or in other embodiments, the minimum average peel force F can be up to about 200 On or up to about 100 On. For example, the minimum average peel force F can be in a range of about 20 On to about 200 g/in.

Figure 6:
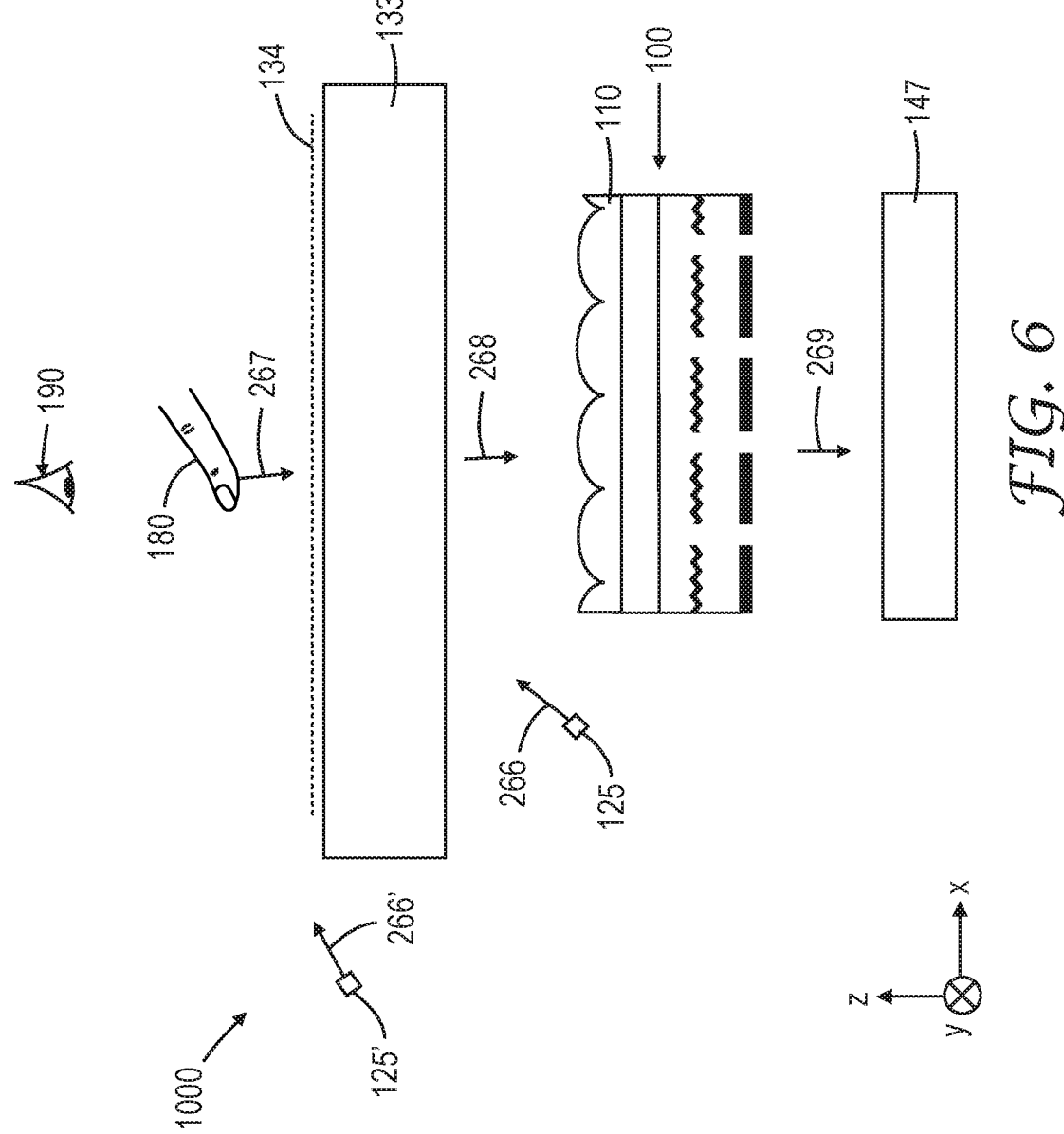
FIG. 6 is a schematic cross-sectional view of a display system, according to some embodiments.

FIG. 6 is a schematic cross-sectional view of an illustrative display system 1000 for sensing a finger 180 of a user 190 applied to the display system 1000, according to some embodiments. The display system 1000 includes a display panel 133; a sensor 147 for sensing the finger 180 of the user 190 disposed proximate the display panel 133; and the optical construction 100 disposed between the display panel 133 and the sensor 147, with the lens layer 110 facing away from the sensor 147. The display system 1000 can include an infrared light source 125 and/or 125' configured to emit an infrared light 266 and/or 266', respectively, toward the finger 180 of the user 190 so that at least a portion 267 of the infrared light can be reflected from the finger 180. The optical construction 100 is disposed to receive at least a portion 268 of the reflected infrared light 267 and transmit at least a portion 269 thereof to the sensor 147. The display panel 133 can be configured to generate an image 134 for viewing by the user 190. The display panel can be any suitable display panel such as an organic light emitting diode (OLED) display panel or a liquid crystal display (LCD) panel. Various other films or elements may be included in the display system 1000. For example, in the case of an LCD display panel, a backlight may be disposed between the display panel 133 and the optical construction 100 and prism films may be disposed between the backlight and the display panel, for example. Related optical constructions and their use in display systems are described in International Appl. Pub. No. WO 2020/035768 (Yang et al.), in U.S. Appl. No. 63/080,105 filed Sep. 18, 2020 and titled "Optical Construction and Optical System Including Light Absorbing Optical Cavity", and in U.S. Appl. No. 62/944,676 filed Dec. 6, 2019 and titled "Optical Layer and Optical System".

EXAMPLES

One dimensional (linear) nanostructured films were designed and fabricated by casting and curing an acrylate resin against a tool and onto a PET substrate. The nanostructures had a pitch and a height of about 225 nm. Polymeric (acrylate-based) microlenses were cast upon the side of the substrate opposite the nanostructures and a metal layer was deposited on the nanostructures. Four pure metals were selected for comparison: titanium, zirconium, nickel, and silver, along with the alloys stainless steel 304 (SS) and chromiumso-nickel$_{20}$. The following table summarizes the materials used, the type of sputtering source (planar or circular magnetron tool) and associated substrate motion (roll to roll (R2R) or rotary) during coating. Zirconium was coated in two different arrangements. Each combination of material, tool and substrate motion was pre-studied to determine sputtering power and coating time to provide an optical density of 3.3 (0.05% transmittance) when coated upon a flat (non-structured) film. Through holes in the resulting undulating metal layer were formed by laser ablation through the microlens layer.

Reflectance was measured with a diode array spectrophotometer (tec5, Nynomic AG, Germany). The samples were individually place upon a sample stage beneath a bifurcated optical cable. In this setup, one bifurcated end was coupled to a Tungsten-Halogen lamp, while the other is connected to the tec5 spectrometer. Light from the lamp traveled via the first bifurcated end to the distal end of the probe and reflected from the sample. The reflected light traveled from the distal end to the second bifurcated end, where it then coupled into the spectrometer for analysis. Reflected intensity was determined relative to the uncoated substrate, which was a PET film, and the reflectance (in percent) at a wavelength of 550 nm was estimated from the reflected intensity measurements. The intrinsic reflectance at a wavelength of 550 nm of the flat metal was calculated from the real and imaginary parts of the index of refraction of the metal. Results are provided in the following table.

| Material | Sputter Magnetron Tool | Substrate Motion | Intrinsic Reflectance (%) | Estimated tec5 Reflectance (%) |
|---|---|---|---|---|
| Ti | Planar | R2R | 50.2 | ~10 |
| Zr | Planar | R2R | 52.2 | ~8 |
| $Cr_{80}Ni_{20}$ | Planar | R2R | 57.8 | ~20 |
| SS | Planar | R2R | 62.2 | ~12 |
| Ni | Planar | R2R | 61.2 | ~30 |
| Ag | Circular | Rotary | 98.2 | ~>70 |
| Zr | Circular | Rotary | 52.2 | ~8 |

Figure 7:
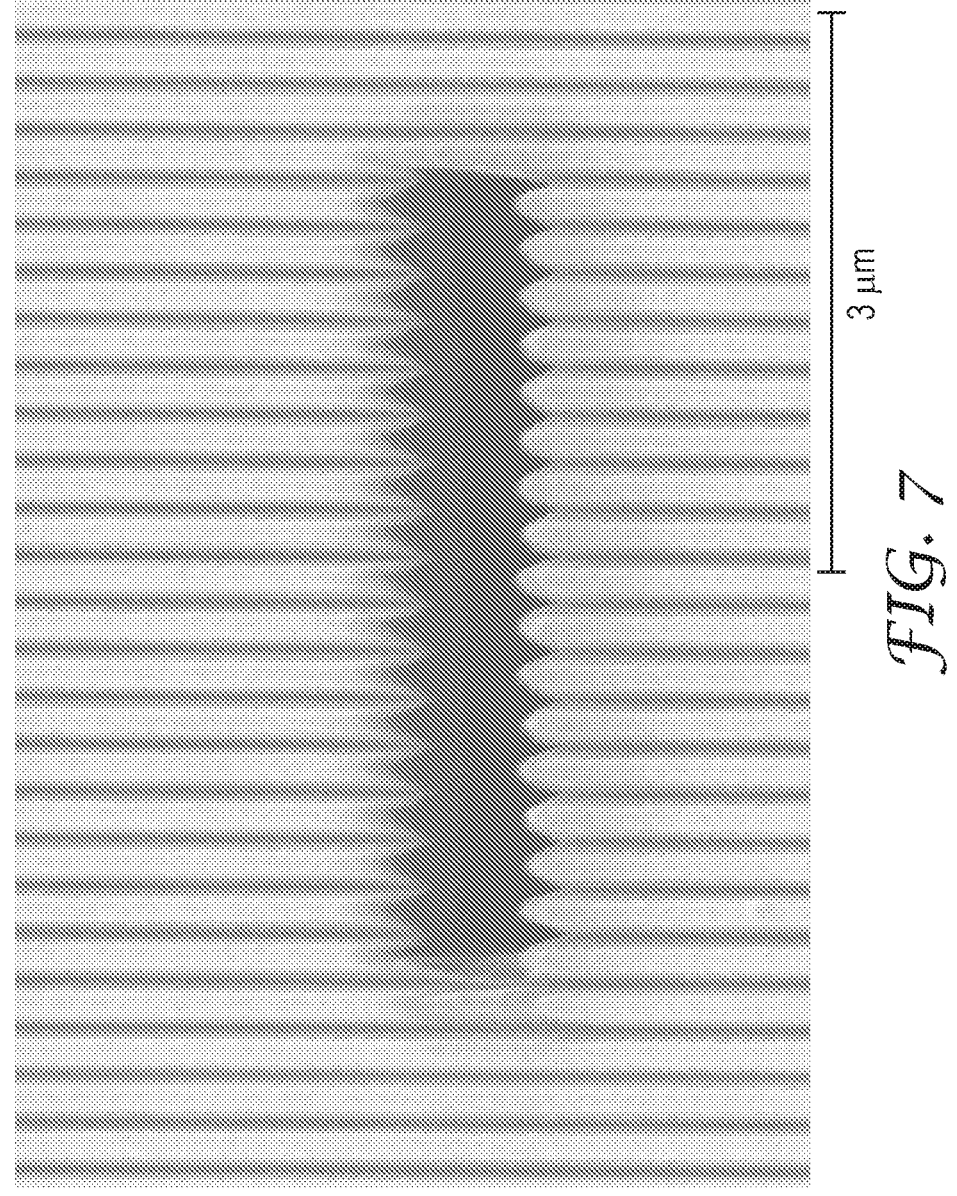
FIGS. 7-8 are images of exemplary undulating metal layers disposed on intermediate layers.
Figure 8:
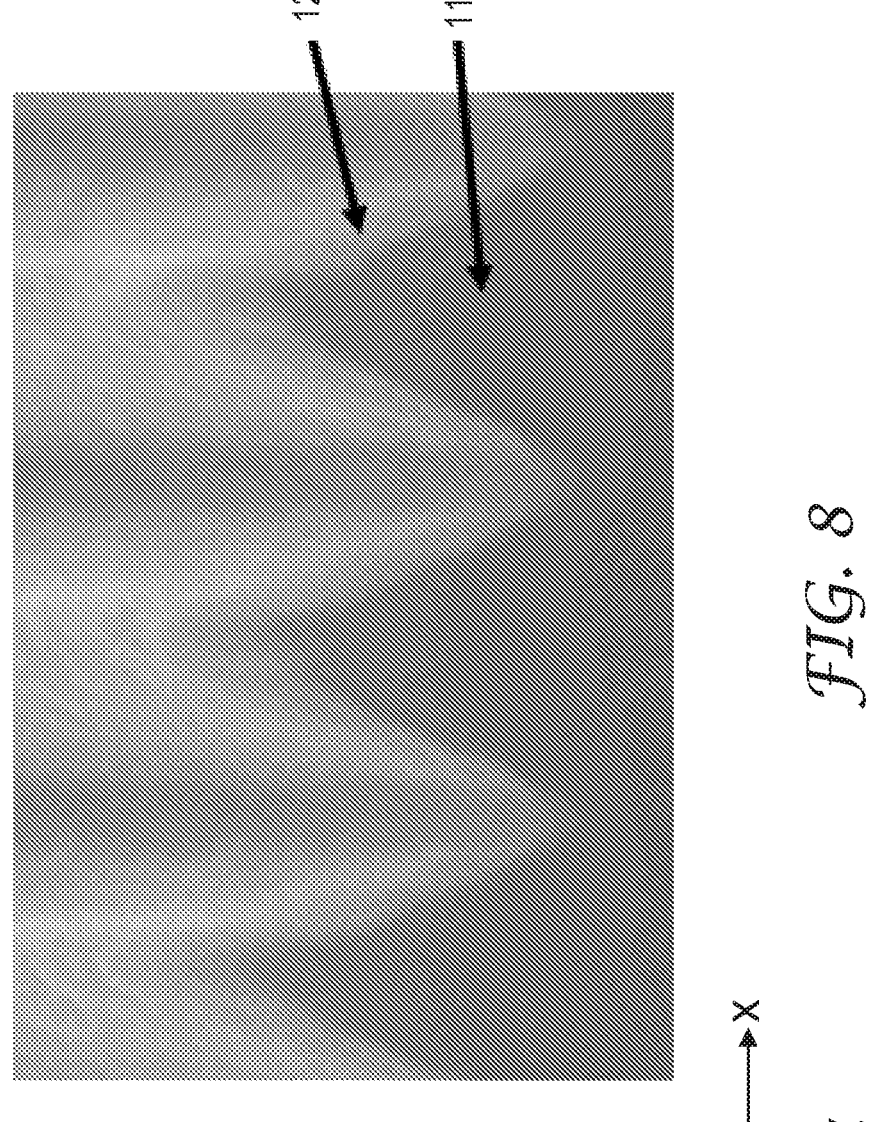
Figure 8:
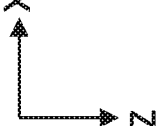

FIG. 7 is an image of a representative sputtered metal layer near a through opening in the metal layer. FIG. 8 is an image of a representative sample at an edge of a through opening in the metal layer 120. The intermediate layer 115 is below the metal layer 120 in FIGS. 7-8.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical construction comprising:
a lens layer comprising a structured first major surface comprising a plurality of microlenses arranged along orthogonal first and second directions;
spaced apart optically opaque first and second mask layers spaced apart from the first major surface and defining respective pluralities of through first and second openings therein arranged along the first and second directions, the first mask layer disposed between the structured first major surface and the second mask layer, there being a one-to-one correspondence between the microlenses and the through first and second openings; and
an intermediate layer disposed between the structured first major surface and the first mask layer and comprising an undulating second major surface facing, and in substantial registration with, an undulating third major surface of first mask layer so as to define a substantially uniform spacing therebetween, wherein the substantially uniform spacing is in a range of about 50 nm to about 500 nm.

2. The optical construction of claim 1, wherein a metal substantially fills the substantially uniform spacing.

3. The optical construction of claim 2, wherein the metal comprises one or more of zirconium, titanium, chromium, nickel, or iron.

4. The optical construction of claim 1, wherein the substantially uniform spacing is in a range of about 50 nm to about 400 nm.

5. The optical construction of claim 1, wherein undulations of the second and third major surfaces are regularly arranged along at least one direction at a pitch of less than about 500 nm.

6. The optical construction of claim 1, wherein the lens and the intermediate layers have respective average thicknesses h1 and h2, $0.7 \leq h2/h1 \leq 5$.

7. The optical construction of claim 1, wherein each of the lens and the intermediate layers comprises an acrylate.

8. The optical construction of claim 1, wherein for a visible light propagating along a direction orthogonal to the first and second directions and incident on the optical construction from the lens layer side thereof, the optical construction reflects less than about 25% of the incident light.

9. An optical construction comprising:
a lens layer comprising a plurality of microlenses arranged along orthogonal first and second directions;
an optically opaque first mask layer spaced apart from the plurality of microlenses and defining a plurality of through first openings therein arranged along the first and second directions, there being a one-to-one correspondence between the microlenses and the through first openings; and
an undulating metal layer having a substantially uniform thickness in a range of about 50 nm to about 500 nm and embedded in the optical construction between the plurality of microlenses and the first mask layer, such that for a visible light propagating along a thickness direction orthogonal to the first and second directions and incident on the optical construction from the lens layer side thereof, the optical construction reflects less than about 25% of the incident light.

10. The optical construction of claim 9, wherein the undulations of the metal layer extend along a third direction and are regularly arranged along an orthogonal fourth direction.

11. The optical construction of claim 9, wherein the undulations of the metal layer are regularly arranged along at least one direction at a pitch of less than about 500 nm.

12. An optical construction comprising:
a lens layer comprising a structured first major surface comprising a plurality of microlenses arranged along orthogonal first and second directions;
spaced apart optically opaque first and second mask layers spaced apart from the first major surface and defining respective pluralities of through first and second openings therein arranged along the first and second directions, the first mask layer disposed between the structured first major surface and the second mask layer, there being a one-to-one correspondence between the microlenses and the through first and second openings; and an intermediate layer disposed between the structured first major surface and the first mask layer and comprising an undulating second major surface facing, and in substantial registration with, an undulating third major surface of first mask layer so as to define a substantially uniform spacing therebetween, wherein the undulations of the second and third major surfaces are regularly arranged along at least one direction at a pitch of less than about 500 nm, wherein the lens and the intermediate layers have respective average thicknesses h1 and h2, $0.7 \leq h2/h1 \leq 5$.

13. The optical construction of claim 12, wherein the undulations of the second and third major surfaces are regularly arranged along at least one direction at a pitch of less than about 500 nm.

14. The optical construction of claim 12, wherein each of the lens and the intermediate layers comprises an acrylate.

15. The optical construction of claim 12, wherein for a visible light propagating along a direction orthogonal to the first and second directions and incident on the optical construction from the lens layer side thereof, the optical construction reflects less than about 25% of the incident light.

16. The optical construction of claim 12, wherein a metal substantially fills the substantially uniform spacing.

17. The optical construction of claim 16, wherein the metal comprises one or more of zirconium, titanium, chromium, nickel, or iron.

18. An optical construction comprising:

a lens layer comprising a structured first major surface comprising a plurality of microlenses arranged along orthogonal first and second directions;

spaced apart optically opaque first and second mask layers spaced apart from the first major surface and defining respective pluralities of through first and second openings therein arranged along the first and second directions, the first mask layer disposed between the structured first major surface and the second mask layer, there being a one-to-one correspondence between the microlenses and the through first and second openings; and an intermediate layer disposed between the structured first major surface and the first mask layer and comprising an undulating second major surface facing, and in substantial registration with, an undulating third major surface of first mask layer so as to define a substantially uniform spacing therebetween, wherein each of the lens and the intermediate layers comprises an acrylate.

19. The optical construction of claim 18, wherein a metal substantially fills the substantially uniform spacing.

\* \* \* \* \*